United States Patent [19]
Latouf

[11] 4,149,514
[45] Apr. 17, 1979

[54] BARBECUE BURNER

[76] Inventor: Joseph A. Latouf, 747 St. Luke Rd., Windsor, Ontario, Canada, N8Y 3M3

[21] Appl. No.: 773,691

[22] Filed: Mar. 2, 1977

[51] Int. Cl.² .............................................. A47J 37/07
[52] U.S. Cl. .................................. 126/9 R; 126/25 R
[58] Field of Search ................. 126/9 R, 25 R, 25 A; D7/107, 110

[56] References Cited

U.S. PATENT DOCUMENTS

| Re. 26,123 | 12/1966 | Davis | 126/9 R X |
|---|---|---|---|
| D. 142,417 | 9/1945 | Jones | D7/107 |
| 1,192,315 | 7/1916 | Hughes | 126/9 R |
| 3,323,443 | 6/1967 | Schulze | 126/25 R X |
| 3,384,066 | 5/1968 | Tufts | 126/9 R |
| 3,489,132 | 1/1970 | West | 126/9 R |
| 3,765,397 | 10/1973 | Henderson | 126/25 R |
| 3,884,214 | 5/1975 | Duncan | 126/9 R X |

FOREIGN PATENT DOCUMENTS

| 457699 | 9/1913 | France | 126/9 R |
| 482595 | 3/1917 | France | 126/9 R |

Primary Examiner—William F. O'Dea
Assistant Examiner—Harold Joyce
Attorney, Agent, or Firm—Otto John Munz

[57] ABSTRACT

A barbecue burner of the type of an upright container. The bottom and virtually all of the side walls of the container are imperforate, except for a narrow, horizontally elongated slot near the top of one of the side walls renders the burner particularly suitable for fast burning fuel such as paper. The barbecue is particularly suitable for outdoor activities as it can be folded and utilizes fuel of the type of old newspapers or the like, thus avoiding the need of relatively bulky and unclean conventional barbecue fuel.

5 Claims, 3 Drawing Figures

BARBECUE BURNER

The present invention relates to a barbecue, particularly to a portable barbecue for use in outdoor activities such as fishing, camping or the like.

Many portable barbecues are known from prior art and available on the market. For instance, Canadian Pat. No. 443,796 (A. Chuhaldin) discloses a portable grill whose walls are made of metal sheet and can be disassembled for easy storage. U.S. Pat. No. 3,384,066 (R. B. Tufts) discloses another type of charcoal burner whose walls are hingedly secured to each other. Another known embodiment of this type is disclosed in U.S. Pat. No. 3,884,214 (J. A. Duncan), disclosing a folding sleeve whose walls are hingedly secured to each other, the sleeve being adapted to be placed onto a barbecue pan or the like.

Even though the above mentioned known types of barbecue can relatively easily be folded and erected, they all have a common feature of their structure being arranged for use with conventional barbecue fuel, in particular charcoal. The known types of barbecue are particularly unsuitable for use with fast burning fuel such as paper, particularly old newspapers or the like. The fast burning fuel, particularly old newspapers or the like, present an ideal fuel from the standpoint of relatively clean handling and easy storage, as opposed to bulk fuel such as charcoal or the like.

Accordingly, it is an object of the present invention to provide a barbecue burner particularly suitable for use with fast burning fuel such as paper. According to the invention, a barbecue burner is provided which comprises, in combination, a generally imperforate bottom wall section and a generally upright wall section; means for securing said generally upright wall section to the bottom wall section to provide a generally upright container open on top, said generally upright wall section including a bottom edge and a top edge, the distance between the top edge and the bottom edge defining the height of said generally upright wall section, said upright wall section being imperforate except for a narrow, horizontally elongated fuel feeding slot means disposed relatively close to said top edge and relatively remote from the bottom edge of the generally upright wall section.

In the context of the present invention, the term "generally imperforate" means that there are no openings in the bottom wall section designed to provide air draught assisting in burning the fuel. Thus for instance, a bottom wall having openings for receiving support legs or the like is still to be considered as following within the scope of the above term.

The slot means is covered, preferably by cover means of the type of a plate member hingedly secured to a portion of the generally upright wall section for a generally pivotal movement about an axis closely spaced from and located above the level of said slot means, whereby said plate is normally maintained in an closed position by gravity.

A preferred embodiment of the present invention will now be disclosed in a greater detail with reference to the accompanying schematic drawings. In the drawings.

Figure 1:
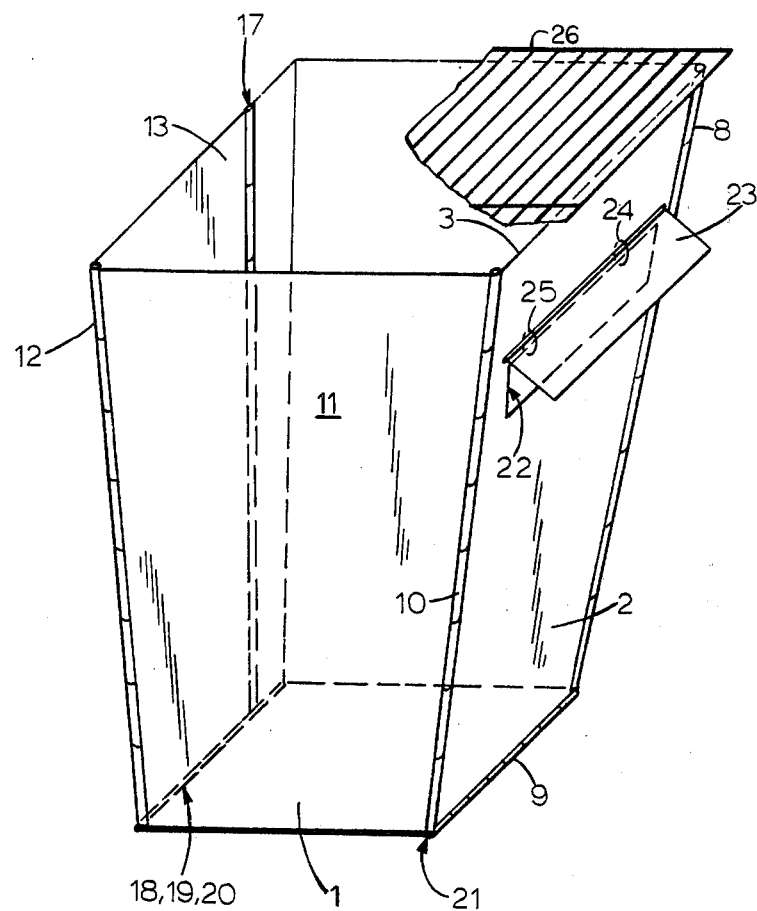
FIG. 1 is a perspective view of a foldable barbecue burner in erected position.

The barbecue burner shown in FIG. 1 comprises an imperforate bottom wall 1 also referred to as "a generally imperforate bottom wall section". The bottom wall 1 is surrounded at its periphery with a peripheral wall section comprising a first trapezoidal wall 2, also referred to as a first upright wall member 2. The first upright wall member 2 includes, in general terms, a top edge 3, a bottom edge 4 and two side edges 5, 6. The first wall 2 is hingedly secured to a second wall 7 along a hinge 8, while the bottom wall 1 is hingedly secured to the first wall 2 by a hinge 9, extending along the bottom edge 4 of the first wall 2. A hinge 10, extending along the side edge 6, secures the first wall 2 to a third wall 11, which, in turn, is hingedly secured by a hinge 12 to a fourth wall 13.

It will be observed that the second wall 7 has an angled portion 14 whose terminal edge is provided with a polarity of hinge eyelets 15 which operatively match with eyelets 16 of the terminal edge of the fourth wall 13. Accordingly, with the barbecue in assembled state as shown in FIG. 1, a connector rod 17 can be inserted into coaxially arranged eyelets 15, 16 to hold the side wall portion, also referred to as an upright wall section, together.

It will be appreciated that the second, third and fourth walls 7, 11, 13 have each a top, bottom and side edges similar to those referred to in connection with wall 2. The edge of the bottom wall 1 opposite to hinge 9 is provided with hinge eyelets 18 adapted to be positioned coaxially with eyelet 19 of the angle portion 14 and with eyelets 20 of the bottom edge of wall 13. Accordingly, when the barbecue is assembled, a connector rod 21 can be inserted into the coaxial eyelets 18, 19 and 20.

It will be appreciated that even though the preferred embodiment shows side walls of a trapezoidal contour, the walls may still be referred to as forming a generally upright, or upright wall section surrounding the bottom member 1.

All of the wall members and the hinges are made of metallic material, resistant to heat, such as metal sheet.

Figure 2:
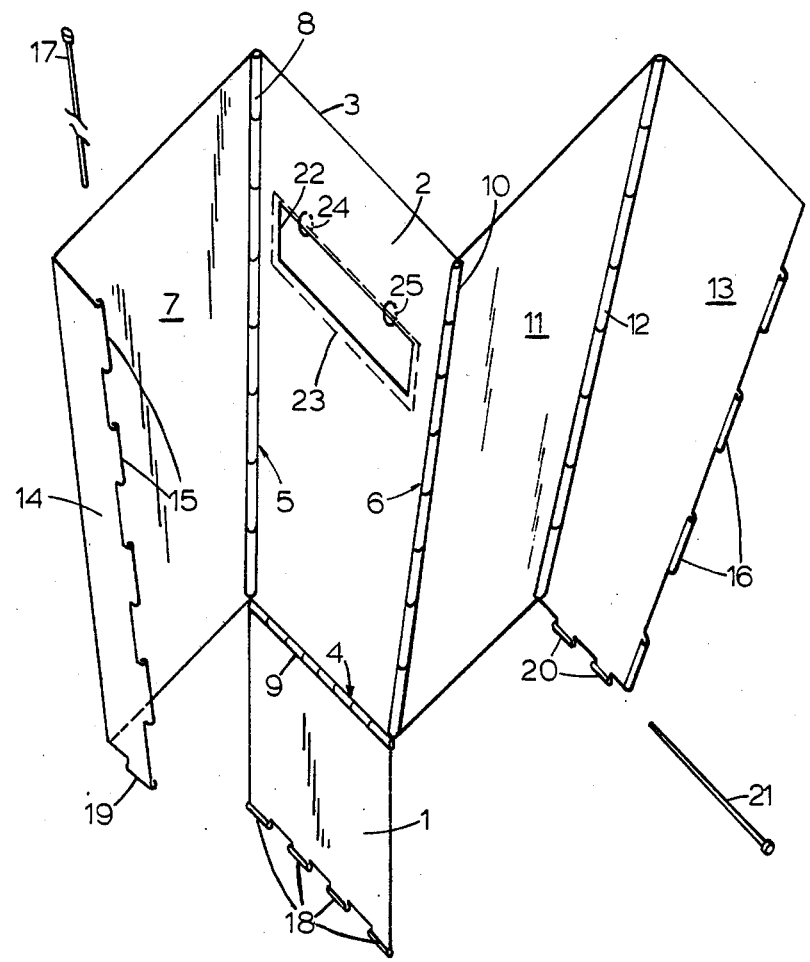
FIG. 2 is a perspective view showing the barbecue of FIG. 1 in a disassembled state.
Figure 3:
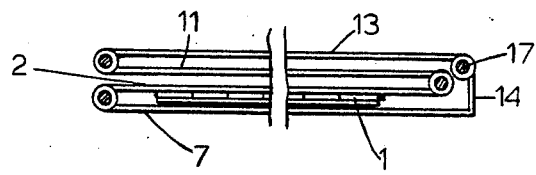
FIG. 3 is a simplified bottom view of the barbecue burner as in a folded state.

The walls 7, 11 and 13, together with the bottom wall 1 are all imperforate, as best seen from FIGS. 1 and 2. Furthermore, wall 2 is also imperforate except for a narrow slot 22 extending along the top edge 3 of the wall 2. The slot 22 is covered by a cover plate 23. The plate 23 is secured to the wall 2 by two rings 24, 25 which allow for pivotal movement of the plate 23 to make it possible to uncover the slot 22, as indicated in FIG. 1. In normal conditions, it would be appreciated that the plate 23 is held by gravity in a generally upright position closing the slot 22. The plate or flap 23 can also be referred to as "cover means for closing said slot means".

It will also be observed that the slot 22 is located relatively close to the top edge 3 of the respective wall 2 and relatively remote from the bottom edge 4 of same.

In use, the burner is first assembled to a state as shown in FIG. 1. Approximately three sheets of an old newspaper are folded to cover the bottom wall, and ignited. Further sheets, approximately three pieces, are folded and placed on the lowermost burning layer of paper. The subsequent sheets are delivered into the container through the slot 22. Accordingly, a grill 26 or the like can remain on top of the container even during the infeed of further fuel paper. This provides considerable advantage over most of portable barbecues which require that the grill or the like be always removed when adding more fuel into the barbecue container.

The overall assembly as shown in FIG. 1 is approximately 50 cm in height. The assembly can be easily folded by first removing the rods 17, 21 from then folding the bottom wall 1 about hinge 9 such that the bottom 1 is generally coincident with the surface of the first wall 2. The wall 2 is then pivoted about hinge 8 to become generally coincident with the second wall 7. The third wall 11 can now be turned counterclockwise (FIG. 2) to become generally coincident with the opposite surface of wall 2. Finally, the fourth wall 13 is pivoted clockwise about hinge 12 until the eyelet 16 becomes generally coaxial with eyelet 15. The rod 17 can then be reinserted and the folded barbecue stored away.

Those skilled in the art will readily conceive further embodiments of the present invention. For example, the shape of the walls may differ from that shown. The hinges may be of different type or may be entirely omitted if it is desired to produce a non-folding arrangement. The cover plate 23 can be replaced by many other known devices. The actual shape of the side walls may differ from that shown in the preferred embodiment, even though the shape of slightly trapezoidal walls with their minor bases coincident with the bottom is preferable.

These and many other departures from the embodiment disclosed with reference with the encompanying drawings, however, do not depart from the scope of the present invention as defined in the accompanying claims.

The embodiments of the invention in which an exclusive property or privilege is claimed are defined as follows:

1. A foldable barbecue burner for use with fast burning fuel such as paper, comprising, in combination, a generally imperforate bottom wall section and a generally upright wall section; means for securing said generally upright wall section to the bottom wall section to provide a generally upright container open on top, said generally upright wall section including a plurality of joined together wall sections foldable relative to one another, and having a bottom edge and a top edge, the distance between the top edge and the bottom edge defining the height of said generally upright wall section, said generally upright wall section being imperforate except for a narrow, horizontally elongated, fuel feeding slot means disposed relatively close to said top edge and relatively remote from said bottom edge of the generally upright wall section, said fuel feeding slot means being providded with cover means of the type normally maintaining the slot means in a closed state, whereby all walls of said burner are normally devoid of any vent openings.

2. A burner as claimed in claim 1, wherein said cover means is a plate member loosely hingedly secured to a portion of said generally upright wall section for a generally pivotal movement about an axis closely spaced from and located above the level of said slot means, whereby said plate is normally maintained in a position over said slot means, by gravity.

3. A foldable burner of the type comprising, in combination:
 (a) a rectangular, generally imperforate bottom member of metal sheet, said bottom member being hingedly secured to a first upright wall member, near a bottom edge thereof;
 (b) said first upright wall member being a quadrilateral metal sheet member including two side edges, a top edge and said bottom edge;
 (c) said first upright wall member forming a portion of an upright wall section wherein said first upright wall member, a second upright wall member, a third upright wall member and a fourth upright wall member are hinged to each other along adjacent side edges thereof, said second, third and fourth wall members being generally identical in shape with said first upright wall member;
 (d) said upright wall members being imperforate except for at least one slot means in at least one of said upright wall members, said slot means extending generally parallel with the top edge of the respective upright wall member, said slot means being located relatively close to the top edge and relatively remote from the bottom edge of the respective wall member;
 (e) means for releasibly securing said bottom member to at least one of said second, third and fourth upright wall members; and
 (f) means for releasibly securing two of said upright wall members to each other along adjacent side edges thereof to form a four-sided enclosure whose bottom periphery is generally coincident with the periphery of said bottom member; and
 (g) cover means secured to said at least one upright wall member at said at least one slot means, said cover means being of the type normally maintaining the slot means in a closed state; whereby all wall members of said burner are generally free of any vent openings to render the burner suitable for use with fast burning fuel such as newspaper sheets.

4. A burner as claimed in claim 3, wherein said cover means is a plate member loosely hingedly secured to a portion of the respective wall member for swinging movement about an axis located at a pivot level, said pivot level being disposed between the top edge and the adjacent edge of said slot means.

5. A burner as claimed in claim 3, wherein said slot means is a single slot provided in one of said upright wall members only.

* * * * *